United States Patent [19]
Walsh et al.

[11] Patent Number: 5,441,997
[45] Date of Patent: Aug. 15, 1995

[54] HIGH DENSITY POLYESTER-POLYCARBONATE MOLDING COMPOSITION

[75] Inventors: Eileen B. Walsh, Evansville; Angelika H. Clark, Mt. Vernon, both of Ind.; Ronald D. Courson, Crossville, Ill.; Robert R. Gallucci, Mt. Vernon, Ind.

[73] Assignee: General Electric Company, Pittsfield, Mass.

[21] Appl. No.: 164,654

[22] Filed: Dec. 8, 1993

Related U.S. Application Data

[63] Continuation of Ser. No. 995,243, Dec. 22, 1992, abandoned.

[51] Int. Cl.$^6$ .................... C08K 5/524; C08K 3/32; C08K 3/22
[52] U.S. Cl. .................... 524/147; 524/151; 524/413; 524/414; 524/417; 524/423; 524/494
[58] Field of Search ............... 524/147, 151, 152, 153, 524/413, 417, 423, 494, 414

[56] References Cited

U.S. PATENT DOCUMENTS

| | | |
|---|---|---|
| Re. 31,992 | 10/1985 | Ancker et al. |
| 2,249,950 | 7/1941 | Fuller .................. 528/281 |
| 2,465,319 | 3/1949 | Whinfield et al. |
| 2,901,466 | 8/1959 | Kibler et al. |
| 3,023,192 | 2/1962 | Shivers et al. |
| 3,047,539 | 7/1962 | Pengilly |
| 3,462,389 | 8/1969 | Schulde et al. |
| 3,479,319 | 11/1969 | Hergenrother ............. 524/417 |
| 3,651,014 | 3/1972 | Witsiepe |
| 3,764,576 | 10/1973 | Russo |
| 3,763,109 | 10/1973 | Witsiepe |
| 3,766,146 | 10/1973 | Witsiepe |
| 3,784,520 | 1/1974 | Hoeschele |
| 3,801,547 | 4/1974 | Hoeschele |
| 3,935,081 | 1/1976 | Shotton |
| 3,953,394 | 4/1976 | Fox et al. |
| 3,953,539 | 4/1976 | Kawase et al. ............ 524/417 |
| 3,971,753 | 7/1976 | Anderson |
| 3,971,763 | 7/1976 | Frechtling et al. |
| 3,986,997 | 10/1976 | Clark |
| 4,043,971 | 8/1977 | Wurmb et al. |
| 4,088,709 | 5/1978 | Seymour et al. |
| 4,156,774 | 5/1979 | Buxbaum et al. |
| 4,197,335 | 4/1980 | Goossens |
| 4,264,761 | 4/1981 | McGirk |
| 4,278,804 | 7/1981 | Ashby et al. |
| 4,284,550 | 8/1981 | Mizuno et al. |
| 4,293,479 | 10/1981 | Hanada et al. |
| 4,348,462 | 9/1982 | Chung |
| 4,351,758 | 9/1982 | Lu et al. |
| 4,353,817 | 10/1982 | Nakae et al. |
| 4,355,155 | 10/1982 | Nelson |
| 4,357,271 | 11/1982 | Rosenquist |
| 4,369,280 | 1/1983 | Dieck et al. |
| 4,379,190 | 4/1983 | Schenck |
| 4,444,931 | 4/1984 | Lu et al. |
| 4,483,958 | 11/1984 | Kosaka et al. |
| 4,491,508 | 1/1985 | Olson et al. |
| 4,510,196 | 4/1985 | Carter, Jr. |
| 4,532,290 | 7/1985 | Jaquiss et al. |
| 4,548,979 | 10/1985 | Weise et al. |
| 4,556,688 | 12/1985 | McCready et al. |
| 4,556,705 | 12/1985 | McCready |
| 4,598,117 | 7/1986 | Liu et al. |
| 4,624,870 | 11/1986 | Anthony |
| 4,626,566 | 12/1986 | Miller et al. |
| 4,639,486 | 1/1987 | Liu |
| 4,661,555 | 4/1987 | Koga et al. |
| 4,664,983 | 5/1987 | Nakamura et al. |
| 4,672,086 | 6/1987 | Seiler et al. |
| 4,687,692 | 8/1987 | Hepp |
| 4,687,802 | 8/1987 | Hepp |
| 4,714,657 | 12/1987 | Quinn et al. |
| 4,722,959 | 2/1988 | Inoue et al. |
| 4,732,928 | 3/1988 | Mizushiro et al. |
| 4,732,939 | 3/1988 | Hoshi et al. |
| 4,734,450 | 3/1988 | Kawai et al. |
| 4,760,112 | 7/1988 | McCready et al. |
| 4,780,402 | 10/1988 | Remmington |
| 4,780,527 | 10/1988 | Tong et al. |
| 4,790,965 | 12/1988 | Hoshi et al. |
| 4,891,397 | 1/1990 | Liu |
| 4,891,399 | 1/1990 | Ohkawa et al. |
| 4,916,170 | 4/1990 | Nambu et al. |
| 4,981,898 | 1/1991 | Bassett .................. 524/417 |
| 4,988,740 | 1/1991 | Walter |
| 5,026,758 | 6/1991 | Grigo et al. |
| 5,132,353 | 7/1992 | Wallace |
| 5,149,734 | 9/1992 | Fisher et al. ............ 524/423 |

FOREIGN PATENT DOCUMENTS

| | | |
|---|---|---|
| 0019926 | 12/1980 | European Pat. Off. |
| 0186011 | 7/1986 | European Pat. Off. |
| 264143 | 4/1988 | European Pat. Off. |
| 0416407 | 3/1991 | European Pat. Off. |
| 230252 | 11/1985 | Germany |
| 51-47739 | 12/1976 | Japan |
| 52-80345 | 7/1977 | Japan |
| 53-101038 | 9/1978 | Japan |
| 53-102381 | 9/1978 | Japan |
| 56-67363 | 6/1981 | Japan |
| 60-23163 | 2/1985 | Japan |
| 60-231763 | 11/1985 | Japan |
| 63-119084 | 5/1988 | Japan |
| 1-178540 | 7/1989 | Japan |
| 2-284942 | 11/1990 | Japan |
| 1060401 | 3/1967 | United Kingdom |
| 1466154 | 3/1977 | United Kingdom |
| WO-A-92 07026 | 4/1992 | WIPO |

*Primary Examiner*—Veronica P. Hoke

[57] ABSTRACT

A composition is disclosed which includes polybutylene terepthalate or polyethylene terephthalate, or blends of polybutylene terephthalate and polyethylene terephthalate, a polycarbonate, barium sulfate, strontium sulfate, zinc sulfate or zirconium oxide fillers, a phosphorus-containing stabilizer and optionally a styrene rubber impact modifier.

29 Claims, No Drawings

HIGH DENSITY POLYESTER-POLYCARBONATE MOLDING COMPOSITION

This is a continuation of application Ser. No. 07/995,243 filed on Dec. 22, 1992, now abandoned.

The present invention is concerned with stable blends which comprise a polyester resin, a polycarbonate resin, a high level of an inorganic filler and a stabilizer.

BACKGROUND OF THE PRESENT INVENTION

Thermoplastic injection molding compositions which include a polybutylene terephthalate, polyethylene terephthalate, a polycarbonate and from 5–40% by weight barium sulfate and glass fibers are described in East German Patent No. 230,252A. When these compositions are extruded, the melt viscosity increases and the color of the extrudate changes. In copending application Ser. No. 07/424,749, there are disclosed compositions of polybutylene terephthalate; polyethylene terephthalate and from 30–85% by weight of barium sulfate The compositions of application Ser. No. 07/424,749, which have high levels of barium sulfate, were disclosed as having a ceramic like feel and appearance because of the density, and the smooth glossy surface.

When polybutylene terephthalate or polyethylene terephthalate molding compositions which include a polycarbonate resin are extruded, there may be a chemical reaction which causes changes in melt viscosity, crystallinity or color or may give rise to gaseous by-products.

U.S. Patent No. 4,532,290 discloses the use of monosodium phosphate and/or monopotassium phosphate as a stabilizer to prevent undesirable changes in the melting point of a polycarbonate-polyester resin blend.

The applicants have discovered that compositions which are based on a polybutylene terephthalate or polyethylene terephthalate resin, or a mixture thereof with a polycarbonate resin with high levels of a inorganic filler will have improved impact resistance as compared to similar polyester resin composition while retaining a ceramic-like feel. The styrene rubber impact modifier provides impact strength without loss of the ceramic like qualities. Certain impact modifiers like polyolefins are impractical because they have a waxy feel which is unacceptable in many applications.

The present invention is based on the discovery that thermoplastic compositions of a polybutylene terephthalate and/or polyethylene terephthalate and an aromatic polycarbonate and particular inorganic fillers may be molded into an article having ceramic like properties and good impact strength. If a stabilizer selected from the group consisting of a particular class of acidic phosphate salts, phosphites, phosphate salts of a Group IB or Group IIB metal, polyacid pyrophosphates and salts thereof, and phosphorous oxo acids are added to such compositions melt stability and color are improved. The inorganic fillers are selected from the group consisting of barium sulfate, strontium sulfate, zirconium oxide and zinc sulfate. If desired, a styrene rubber impact modifier may be added to the composition of the invention as well as a fibrous glass reinforcing filler. The compositions of the invention have increased resistance to color changes and melt viscosity changes when subjected to abusive molding conditions, or the repeated molding cycles which are required for the reprocessing of scrap. In addition, interpolymer formation is retarded and crystallinity is retained.

Accordingly, it is an object of the invention to provide a polyester-polycarbonate molding composition which has ceramic like qualities and can be molded into relatively thin sections.

It is also an object of this invention to provide a polyester-polycarbonate composition which has ceramic like qualities and an impact modifier which provides exceptionally high impact strength.

These and other objects will become apparent from the present application.

SUMMARY OF THE INVENTION

The invention provides compositions and molded articles which comprise:
(a) from 0–60 weight percent of polybutylene terephthalate resin;
(b) from 0–60 weight percent of a polyethylene terephthalate resin with the proviso that the sum of the amounts of the polybutylene terephthalate resin and the polyethylene terephthalate resin must be at least 10 weight percent of the total composition;
(c) from 10–30 weight percent of an aromatic polycarbonate resin with the proviso that (a)+(b) is greater than or equal to (c);
(d) an effective amount of a stabilizer selected from the group consisting of phosphites, acidic phosphate salts, polyacid pyrophosphates and salts thereof, phosphate salts of Group IB or Group IIB and phosphorous oxo-acids;
(e) from 0–15 weight percent of a styrene rubber impact modifier; and
(f) from 29.99–79.99 weight percent of an inorganic filler selected from the group consisting of barium sulfate, strontium sulfate, zirconium oxide and zinc sulfate.

The invention also includes compositions and molded articles which comprise:
(a) from 0–30 weight percent of a polybutylene terephthalate resin;
(b) from 0–30 weight percent of a polyethylene terephthalate resin, with the proviso that the sum of the amounts of polybutylene terephthalate resin and the polyethylene terephthalate resin must be at least 10 weight percent of the total composition;
(c) from 10–30 weight percent of an aromatic polycarbonate resin;
(d) an effective amount of a stabilizer selected from the group consisting of phosphites, acidic phosphate salts, polyacid pyrophosphates and salts thereof, phosphate salts of a Group IB or Group IIB metal and phosphorous oxo-acids;
(e) from 0–10 weight percent of a styrene rubber impact modifier; and
(f) from 30–79.99 weight percent of an inorganic filler selected from the group consisting of barium sulfate, strontium sulfate, zirconium oxide and zinc sulfate.

The compositions of the invention may also comprise from 5–30 weight percent of a fibrous glass reinforcing filler. If a glass filler is employed, the relative amounts of the other components may be reduced proportionately. Preferred composition will have a weight ratio of (a):(b):(c) of about 2:1:3.

DETAILED DESCRIPTION OF THE INVENTION

Polyesters generally for use herein are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeated units of the following general formula:

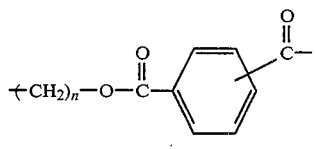

wherein n is an integer of from 2 to 6. The most preferred polyesters are poly(ethylene terephthalate) and poly(1,4,butylene terephthalate).

Also contemplated herein are the above polyesters with minor amounts, e.g., from 0.5 to about 5 percent by weight, of units derived from aliphatic acids and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

The polyesters used herein have an intrinsic viscosity of from about 0.4 to about 2.0 dl/g as measured in a 60:40 phenol/tetrachloroethane mixture or similar solvent at 23°-30° C.

The high molecular weight aromatic polycarbonate resins are well known compounds which are described along with methods for their preparation in U.S. Pat. Nos. 3,989,672; 3,275,601 and 3,028,365, all of which are incorporated herein by reference.

They may be conveniently prepared by the reaction of at least one dihydric phenol and a carbonate precursor. The dihydric phenols employed in the practice of this invention are known dihydric phenols which may be represented by the general formula:

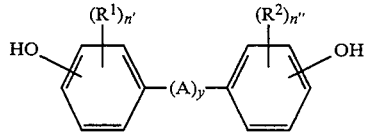

wherein:

$R^1$ is independently selected from halogen, monovalent hydrocarbon, and monovalent hydrocarbonoxy radicals;

$R^2$ is independently selected from halogen, monovalent hydrocarbon, and monovalent hydrocarbonoxy radicals;

A is selected from divalent hydrocarbon radicals,

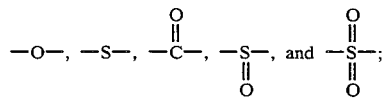

n' and n" are independently selected from integers having a value of from 0 to 4 inclusive; and y is either zero or one.

The monovalent hydrocarbon radicals represented by $R^1$ and $R^2$ include the alkyl, cycloalkyl, aryl, aralkyl, and alkaryl radicals.

The preferred alkyl radicals are those containing from 1 to about 12 carbon atoms. The preferred cycloalkyl radicals are those containing from 4 to about 12 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The preferred halogen radicals represented by $R^1$ and $R^2$ are chlorine and bromine.

The monovalent hydrocarbonoxy radicals may be represented by the general formula —$OR^3$ wherein $R^3$ has the same meaning as $R^1$ and $R^2$. The preferred hydrocarbonoxy radicals are the alkoxy and the aryloxy radicals.

The divalent hydrocarbon radicals represented by A include the alkylene, alkylidene, cycloalkylene, and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

Some illustrative non-limiting of suitable dihydric phenols include:
2,2-bis(4-hydroxyphenyl)propane (bisphenol-A);
2,2-bis (3,5-dimethyl-4-hydroxyphenyl)propane;
2,2-bis (3,5-dibromo-4-hydroxyphenyl)propane;
1,1-bis (4-hydroxyphenyl)cyclohexane;
1,1-bis (3,5-dimethyl-4-hydroxyphenyl)cyclohexane;
1,1-bis (4-hydroxyphenyl)cyclododecane;
1,1-bis (4-hydroxyphenyl)decane;
1,4-bis (4-hydroxyphenyl)butane;
p,p'-dihydroxydiphenyl;
bis(4-hydroxyphenyl)ether;
1,1-bis(4-hydroxyphenyl)-3,3,5-trimethylcyclohexane; and
4,4'-thiodiphenol.

Other useful dihydric phenols are described, inter alia, in U.S. Pat. Nos. 3,028,365; 2,999,835; 3,148,172; 3,271,368, 2,991,273; 3,271,367; 3,280,078; 3,014,891 and 2,999,846, all of which are incorporated herein by reference.

The carbonate precursors employed in the practice of the instant invention include the carbonyl halides, the bishaloformates, and the diarylcarbonates. The carbonyl halides include carbonyl bromide, carbonyl chloride, and mixtures thereof. Typical of the diarylcarbonates are diphenyl carbonate; di(halophenyl) carbonates such as di(chlorophenyl)carbonate, di(bromophenyl) carbonate, di(trichlorophenyl)carbonate, and di(tribromophenyl)carbonate; di(alkylphenyl)carbonates such as di(tolyl)carbonate; dinaphthyl carbonate; di(halonaphthyl)carbonates; and naphthyl phenyl carbonate. The bishaloformates suitable for use herein include the bishaloformates of dihydric phenols such as the bischloroformates of hydroquinone and bisphenol-A; the bishaloformates of glycols such as the bischloroformates of ethylene glycol, neopentyl glycol, and polyethylene glycol.

The polycarbonates of the instant invention contain at least one recurring structural unit represented by the formula:

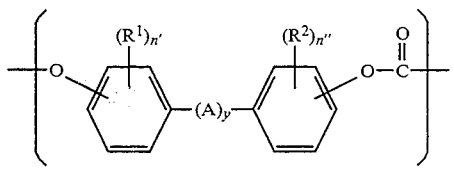

wherein A, $R^1$, $R^2$, n', n" and y are as defined hereinafore. Monofunctional phenols can be added as end capping agents to the polymerization to control molecular weight and provide desired properties.

The instant polycarbonates are high molecular weight aromatic carbonate polymers having an intrinsic viscosity, as determined in chloroform at 25° C. of from about 0.3 to about 1.5 dl/gm, preferably from about 0.45 to about 1.0 dl/gm. These polycarbonates may be branched or unbranched and generally will have a weight average molecular weight of from about 10,000 to about 200,000, preferably from about 20,000 to about 100,000 as measured by gel permeation chromatography.

The branched polycarbonates may be prepared by adding a branching agent during polymerization. These branching agents are well known and may comprise organic polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol,tris-phenol TC (1,3,5-tris((p-hydroxyphenyl)isopropyl)benzene),-tris-phenol PA (4(4(1,1-bis(p-hydroxyphenyl)-ethyl)alpha, alpha-dimethyl benzyl)phenol), 4-chloroformyl phthalic anhydride, trimesic acid and benzophenone tetracarboxylic acid. The branching agent may be added at a level of about 0.05–2.0 weight percent. Branching agents and procedures for making branched polycarbonates are described in U.S. Letters Pat. Nos. 3,635,895; 4,001,184; and 4,204,047 which are incorporated by reference.

In the practice of the present invention, it may be desirable to add an impact modifier which is based on a high molecular weight styrene-diene rubber.

A preferred class of rubber materials are copolymers, including random, block and graft copolymers of vinyl aromatic compounds and conjugated dienes. Exemplary of these materials there may be given hydrogenated, partially hydrogenated, or non-hydrogenated block copolymers of the A-B-A and A-B type wherein A is polystyrene and B is an elastomeric diene, e.g. polybutadiene, polyisoprene, radial teleblock copolymer, of styrene and a Y conjugated diene, acrylic resin modified styrene-butadiene resins and the like; and graft copolymers obtained by graft-copolymerization of a monomer or monomer mix containing a styrenic compound as the main component to a rubber-like polymer. The rubber-like polymer used in the graft copolymer are as already described herein including polybutadiene, styrene-butadiene copolymer, acrylonitrile-butadiene copolymer, ethylene-propylene copolymer, ethylene-butylene copolymer, polyacrylate and the like. The styrenic compounds includes styrene, methylstyrene, dimethylstyrene, isopropylstyrene, alphamethylstyrene, ethylvinyltoluene and the like.

Procedures for the preparation of these polymers are found in U.S. Pat. Nos. 4,196,116; 3,299,174 and 3,333,024, all of which are incorporated by reference.

Barium sulfate may be obtained synthetically or from natural sources.

The preferred form of barium sulfate will have a particle size of 0.1–20 microns. If desired, other reinforcing fillers or non-reinforcing fillers such as talc, clay, mica, glass spheres, wollastonite, and the like may be added. In addition, lubricants, flow aids, antioxidants, flame retardants, ultra-violet stabilizers, colorants, etc. may be added.

The filamentous glass to be employed as a reinforcing agent in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass, ever, other glass compositions are useful. All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 3 to about 20 microns, but this is not critical to the present invention. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur.

The stabilizers are used at a level of 0.01–10 weight percent and preferably at a level of from 0.05–2 weight percent. The stabilizers include an effective amount of an acidic phosphate salt; an acid, alkyl, aryl or mixed phosphite having at least one hydrogen or alkyl group; a Group IB or Group IIB metal phosphate salt; a phosphorous oxo acid, a metal acid pyrophosphate or a mixture thereof. The suitability of a particular compound for use as a stabilizer and the determination of how much is to be used as a stabilizer may be readily determined by preparing a mixture of the polyester component, the polycarbonate and the filler with and without the particular compound and determining the effect on melt viscosity or color stability or the formation of interpolymers.

The acidic phosphate salts include sodium dihydrogen phosphate, mono zinc phosphate, potassium hydrogen phosphate, calcium hydrogen phosphate and the like. The phosphites may be of the formula:

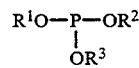

where $R^1$, $R^2$ and $R^3$ are independently selected from the group consisting of hydrogen, alkyl and aryl with the proviso that at least one of $R^1$, $R^2$ and $R^3$ is hydrogen or alkyl.

The phosphate salts of a Group IB or Group IIB metal include zinc phosphate, copper phosphate and the like. The phosphorous oxo acids include phosphorous acid, phosphoric acid, polyphosphoric acid or hypophosphorous acid.

The polyacid pyrophosphates of the formula:

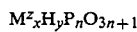

wherein M is a metal, x is a number ranging from 1 to 12 and y is a number ranging 1 to 12, n is a number from 2 to 10, z is a number from 1 to 5 and the sum of $(xz)+y$ is equal to $n+2$.

These compounds include $Na_3HP_2O_7$; $K_2H_2P_2O_7$; $Na_4P_2O_7$; $KNaH_2P_2O_7$ and $Na_2H_2P_2O_7$. The particle size of the polyacid pyrophosphate should be less than 75 microns, preferably less than 50 microns and most preferably less than 20 microns.

Preferred compositions include the following:

| | |
|---|---|
| polybutylene terephthalate | 7-25 wt. % |
| polyethylene terephthalate | 3-10 wt. % |
| aromatic polycarbonate | 10-25 wt. % |
| stabilizer | 0.01-10 wt. % |
| impact modifier | 0-15 wt. % |
| barium sulfate | 40-79.99 wt. % |

Other preferred compositions include:

| | |
|---|---|
| polybutylene terephthalate | 15-30 wt.% |
| polyethylene terephthalate | 5-15 wt.% |
| branched arom. polycarbonate | 20-30 wt.% |
| stabilizer | 0.05-2 wt.% |
| barium sulfate | 30-59.95 wt.% |

A further preferred composition will comprise:

| | |
|---|---|
| polybutylene terephthalate | 6-10 wt. % |
| polyethylene terephthalate | 5-10 wt. % |
| polycarbonate | 12-20 wt. % |
| stabilizer | 0.01-5 wt. % |
| impact modifier | 1-10 wt. % |
| barium sulfate | 59-72.99 wt. % |

As used herein and in the appended claims, the term "weight percent" means the percent by weight of each component based on the total weight of composition.

The invention also includes the novel articles made from the compositions of the invention by methods of sheetforming, extrusion and thermoforming. Extrusion of the highly filled compositions, e.g., more than 30 weight percent or more preferably more than 50 weight percent of an inorganic filler such as barium sulfate is facilitated by the presence of a branched polycarbonate resin and/or a styrene rubber impact modifier.

Articles may be formed from the compositions of the invention by compression molding, injection molding, extrusion, profile extrusion, blow molding, etc. Examples of such articles include counter tops, cutting boards, sinks, building panels, tiles, floor coverings, dishes, shower stalls, signs, toys, musical instruments, piano keys, picture frames, profile moldings and the like.

The molded articles may be embossed or decorated using conventional methods such as sublimination printing, laser marking and the like.

Sheet extrusion may be carried out by extrusion of pelletized resin into sheet using a 2.5" HPM extruder which has a 2 ft. die width. Preferred extrusion conditions are 480° F. die temperature, 420°-520° F. barrel temperature, 280° F. roll temperature and 600 lb/hr feed rate. Sheets of varying thickness, width and surface finish can be prepared by changing the roll temperature, die size, extrusion conditions or thickness of the melt bead.

Samples may be thermoformed into various forms, such as sinks, by drying ⅛" or ¼" thick 2×3 ft. sheets at 240° F. for 12 hours and vacuum forming the sheet at 450°-500° F. The sheets have good melt strength and can be formed into parts with a good surface appearance, high impact strength and uniform wall thickness.

DESCRIPTION OF THE PREFERRED EMBODIMENT

The following examples are presented in order to illustrate the present invention. They are not to be construed to limit the scope of the appended claims.

EXAMPLES 1-6

The following examples illustrate the novel compositions of the invention. The blends are prepared by tumble blending the ingredients, extruding in a 2.5 inch vented single screw extruder with a melt temperature of 500° to 530° F. They are dried and molded on an 80 ton Van Dorn injection molding machine at a temperature of 500° C. and a mold temperature of 150° C.

| Example | 1 | 2 | 3 | 4 | 5 | 6 | Control A |
|---|---|---|---|---|---|---|---|
| PBT[a] | 13.2 | 11.2 | 10.8 | 9.9 | 10.8 | 8.05 | 10.8 |
| PET[b] | 6.6 | 5.6 | 5.3 | 4.9 | 5.3 | 4.0 | 5.3 |
| Polycarbonate[c] | 19.8 | 17.8 | 16.0 | 14.8 | 16.0 | 12.05 | 16.0 |
| ABA block copolymer[d] | — | 5.0 | 7.5 | 10.0 | 7.5 | 7.5 | 7.5 |
| Barium sulfate | 60.0 | 60.0 | 60.0 | 60.0 | 60.0 | 68.0 | 60.0 |
| $NaH_2PO_4$ | — | — | — | — | 0.1 | 0.1 | — |
| DPDP[e] | 0.1 | 0.1 | 0.1 | 0.1 | — | — | — |
| Antioxidant[f] | 0.1 | 0.1 | 0.1 | 0.1 | 0.1 | 0.1 | 0.1 |
| Mold release[g] | 0.2 | 0.2 | 0.2 | 0.2 | 0.2 | 0.2 | 0.2 |
| Test Results: | | | | | | | |
| Melt visc. 266° C., poise | 7,900 | 13,200 | 17,210 | 23,150 | 17,430 | 40,400 | 15,670 |
| Izod, notched Ft. lbs/in. | — | — | 0.95 | 1.1 | 1.1 | 1.1 | 1.0 |
| Izod, unnotched Ft. lbs/in. | 5.0 | 10.4 | 15.3 | 16.3 | 19.0 | 13.3 | 15.0 |
| Flex Strength Kpsi | 15.0 | 13.4 | 11.9 | 9.8 | 10.4 | 10.8 | 10.9 |
| Flex Modulus Kpsi | 829 | 672 | 572 | 400 | 503 | 540 | 519 |
| Specific gravity | 2.21 | 2.15 | 2.11 | 2.11 | 2.12 | 2.31 | 2.12 |
| Color Test[1] | | | | | | | |
| L | — | — | 87.11 | — | 86.68 | — | 86.74 |
| a | — | — | 0.50 | — | 0.55 | — | 0.68 |

| Example | 1 | 2 | 3 | 4 | 5 | 6 | Control A |
|---|---|---|---|---|---|---|---|
| b | — | — | 3.28 | — | 3.19 | — | 4.05 |

[a]Valox ® 295 GE Co. 1200–1800 poise (ASTM method D-1238; Tinius Olsen melt indexer at 250° C., 0.042 inch orifice)
[b]polyethylene terephthalate, IV 0.57 dl/g in 60:40 phenol-tetrachloroethane at 25° C.
[c]Lexan ® IV 0.454 dl/g in chloroform at 25° C.
[d]Kraton ® G 1651, a styrene-ethylene butylene-styrene block copolymer which is commercially available from Shell Chemical Co.
[e]diphenylisodecyl phosphite
[f]tetrakis(methylene (3,5-di-tert-butyl-4-hydroxyhydro cinnamate))methane
[g]pentaerythritol tetrastearate
[1]Color was measured using a Milton-Roy instrument using a cool white fluorescent bulb and an angle of illumination of 10°. CIE(L,a,b,) values were measured versus a white tile standard. Color measurements were made on samples that were aged for one day at 70° C.
L is the change in lightness and darkness; a is the red to green change and b is the blue to yellow change.

The lower b values indicate less yellowing in samples 3 and 5 as compared to the Control A sample. The results show that the use of the stabilizers such as sodium acid phosphate and diphenyl isodecyl phosphite impart a resistance to yellowing as compared to the control samples which had no added stabilizers.

The composition of Example 6 had a higher level of barium sulfate which accounts for the higher melt viscosity. All of these compositions had a smooth, ceramic-like surface.

EXAMPLES 7-11

The following examples were prepared according to the general methods of Examples 1-6:

| Example | 7 | 8 | 9 | 10 | 11 | Control B |
|---|---|---|---|---|---|---|
| PBT[a] | 6.8 | 9.1 | 5.1 | 9.1 | 5.1 | 9.05 |
| PET[b] | 6.8 | 9.0 | 4.0 | x | 4.0 | x |
| Polycarbonate[c] | 13.5 | 9.0 | 18.0 | 18.0 | 18.0 | 18.0 |
| ABA block copolymer[d] | 7.5 | 7.5 | 7.5 | 7.5 | x | 7.5 |
| Barium sulfate | 65 | 65 | 65 | 65 | 65 | 65 |
| Antioxidant[e] | 0.15 | 0.15 | 0.15 | 0.15 | 0.15 | 0.15 |
| Phosphorous Acid (45% aqueous) | 0.05 | 0.05 | 0.05 | 0.05 | 0.05 | x |
| Mold release[f] | 0.2 | 0.2 | 0.2 | 0.2 | 0.2 | 0.2 |
| ABA block copolymer[g] | x | x | x | x | 7.5 | x |
| Test Results: | | | | | | |
| Melt Viscosity 266° C. poise | 21,900 | 20,175 | 30,700 | 23,800 | 19,750 | 27,200 |
| Izod, notched | 1.0 | 0.9 | x | x | x | x |
| Izod, unnotched | 15.0 | 14.5 | 12.8 | 10.5 | 7.5 | 8.8 |
| Tensile Strength Kpsi | 5.2 | 5.0 | 5.3 | 5.2 | 3.4 | 4.6 |
| Flex Strength Kpsi | 10.5 | 10.5 | 10.4 | 9.8 | 7.0 | 9.7 |
| Flex Modulus Kpsi | 519 | 529 | 517 | 497 | — | 510 |
| Specific Gravity | 2.21 | 2.21 | 2.19 | 2.06 | 2.05 | 2.09 |
| Color Test[1] | | | | | | |
| L | — | — | — | 85.45 | — | 85.44 |
| a | — | — | — | 0.67 | — | 0.76 |
| b | — | — | — | 3.28 | — | 3.78 |

[a]-[f]were as in Examples 1-6; g was Kraton G 1901X, maleic anhydride modified SEBS copolymer, Shell Chemical Co.
[1]The same apparatus for measuring color was used that was used to test Examples 3, 5 and Control A.

The Color test shows that phosphorous acid imparts a resistance to yellowing as compared to the control sample which had no phosphorous acid.

EXAMPLES 12-15

The following examples were prepared according to the general methods of Examples 1-6:

| Example | 12 | 13 | 14 | 15 |
|---|---|---|---|---|
| PBT[a] | 11.7 | 11.7 | 11.7 | 11.7 |
| PET[b] | 5.9 | 5.9 | 5.9 | 5.9 |
| Polycarbonate[c] | 15.0 | — | — | — |
| Polycarbonate[d] | — | 15.0 | — | — |
| Polycarbonate[e] | — | — | 15.0 | — |
| Polycarbonate[f] | — | — | — | 15.0 |
| BaSO4 | 60.0 | 60.0 | 60.0 | 60.0 |
| DPDP | 0.1 | 0.1 | 0.1 | 0.1 |
| Test Results: | | | | |
| Melt Visc. poise 266° C. | 8400 | 9900 | 10900 | 13500 |
| Izod, unnotched | 7.6 | 6.7 | 7.3 | 6.6 |
| Flexural Strn. | 11.2 | 8.3 | 9.0 | 8.6 |
| Flexural Mod. | 298 | 233 | 213 | 204 |
| Specific Grav. | 2.15 | 2.16 | 2.16 | 2.10 |

All of the above examples also contained 2.0 wt. percent of titanium dioxide, 5.0 wt. percent of Kraton G 1901x, 0.1 wt. percent of octadecyl-3,5-di-tert-butyl-4-hydroxyhydro-cinnamate.
[a]polybutylene terephthalate as in Example 1
[b]polyethylene terephthalate as in Example 1
[c]polycarbonate resin derived from bisphenol-A and phosgene having an IV of 0.454 dl/g. as measured in chloroform at 25° C.
[d]polycarbonate resin derived from bisphenol-A and phosgene having an IV of 0.471 dl/g. as measured in chloroform at 25° C.
[e]polycarbonate resin derived from bisphenol-A and phosgene having an IV of 0.535 dl/g. as measured in chloroform at 25° C.
[f]polycarbonate resin derived from bisphenol-A, phosgene and 0.40 wt. percent of trimellitic trichloride having an IV of 0.581 dl/g. as measured in chloroform at 25° C.

These examples demonstrate the effect of the use of polycarbonate resins having different molecular weights on the physical properties of the blend.

| Example | Control C | 16 | 17 |
| --- | --- | --- | --- |
| PBT[a] | 24.9 | 24.9 | 24.9 |
| PC[b] | 16.7 | 16.6 | 16.6 |
| PET[c] | 8.3 | 8.3 | 8.3 |
| BaSO$_4$ | 50.0 | 50.0 | 50.0 |
| Antioxidant[d] | 0.1 | 0.1 | 0.1 |
| NaH$_2$PO$_4$ | — | 0.1 | — |
| DPDP | — | — | 0.1 |
| Test Results: | | | |
| Melt Visc. poise 266° C. | 21940 | 19730 | 20350 |
| Izod Unnotched | 7.7 | 9.9 | 7.8 |
| Flexural Strn. | 15.3 | 15.6 | 15.8 |
| Flexural Mod. | 649 | 621 | 671 |
| Specific grav. | 1.92 | 1.95 | 1.98 |
| Normal DSC | | | |
| Tm$^1$ °C. | 220 | 219 | 219 |
| Tm$^2$ °C. | 254 | 252 | 253 |
| Abusive DSC | | | |
| Tm$^1$ °C. | None | 215 | 218 |
| Tm$^2$ °C. | None | 233 | 243 |

[a]Valox ® 315 GE Co., polybutylene terephthalate having a melt viscosity of 7250-9000 poise (ASTM method D-1238; Tinius Olsen melt indexer at 25° C. 0.042 inch orifice)
[b]polycarbonate derived from bisphenol-A, phogene, and 0.40 wt. percent trimellitic trichloride having an IV of 0.581 dl/g. in chlorofrom at 25° C.
[c]polyethylene terephthalate as in Example 1
[d]tetrakis(methylene(3,5-di-tert-butyl-4-hydroxyhydrocinnamate)) methane The normal DSC was carried out with a 10mg. sample heated from 40° to 290° C. at 20° C. per minute. The abusive DSC was carried out as above with a 15 min. hold at 290° C. followed by cooling to 40° C. at 80° C. per minute followed by a second normal scan. The Tm$^1$ is the melting point of the PBT phase and Tm$^2$ is the melting point of the PET phase.

The Control C experiment shows that under abusive melt conditions the blend which does not contain a stablizer reacts to form a non-crystalline copolymer. Neither the PBT nor the PET Tm is observed. The composition shows a Tg of 86° C. When either the monosodium di-hydrogen phosphate or the diphenylisodecyl phosphite is present, the crystalline nature of the blend is retained keeping the ceramic-like properties, the high thermal resistance and the enhanced solvent resistance.

EXAMPLES 18-21

The following examples were prepared using the methods that were used in the preparation of Examples 1-6:

| Example | 18 | 19 | 20 | 21 |
| --- | --- | --- | --- | --- |
| PBT[a] | 8.6 | 8.6 | 8.6 | 7.6 |
| PET[b] | 5.0 | 4.0 | 3.0 | 4.0 |
| Polycarbonate[c] | 18.0 | 15.0 | 13.0 | 10.0 |
| BaSO$_4$ | 63.0 | 62.0 | 60.0 | 63.0 |
| Glass Fibers | 5.0 | 10.0 | 15.0 | 10.0 |
| ABA Copolymer[d] | — | — | — | 5.0 |
| NaH$_2$PO$_4$ | 0.1 | 0.1 | 0.1 | 0.1 |
| Test Results: | | | | |
| Melt Visc. 266° C. | 5520 | 18660 | 34600 | 24870 |
| HDT at 66 psi °F. | 307 | 370 | 369 | 365 |
| Izod, Unnotched | 7.3 | 5.5 | 5.4 | 7.5 |
| Flexural Strn. | 17.8 | 19.8 | 21.4 | 19.0 |
| Flexural Mod. | 922 | 1489 | 1856 | 1300 |

All samples also had 0.1 wt. percent of tetrakis(methylene(3,5-di-tert-butyl-4-hydroxyhydrocinnamate)) methane and 0.2 wt. percent of pentaerythritol tetrastearate.
[a]polybutylene terephthalate as in Example 1.
[b]polyethylene terephthalate as in Example 1.
[c]polycarbonate resin derived from bisphenol-A and phosgene having an IV of 0.454 dl/g. as measured in chlorofrom at 25° C.
[d]Kraton G 1651

The test results for Examples 18-21 show that the heat distortion temperature and flexural modulus values are improved by the addition of glass fibers. The addition of an ABA block copolymer and glass fibers increases the impact strength and the stiffness.

EXAMPLES 22-26

The following examples were prepared using the methods that were used in the preparation of examples 1-6:

| Example | 22 | 23 | 24 | 25 | 26 |
| --- | --- | --- | --- | --- | --- |
| PBT[a] | 27.6 | 20.6 | 17.1 | 24.6 | 20.8 |
| PET[b] | 13.0 | 13.0 | 10.0 | 11.0 | 10.7 |
| PC[c] | 24.0 | 28.0 | 28.0 | 27.0 | 29.1 |
| BaSO$_4$ | 35.0 | 35.0 | 37.0 | 32.0 | 32.6 |
| ABA Copolymer[d] | — | 3.0 | 7.5 | — | 3.8 |
| Fiber Glass | — | — | — | 5.0 | 2.6 |
| NaH$_2$PO$_4$ | 0.1 | 0.1 | 0.1 | 0.1 | 0.1 |
| Test Results: | | | | | |
| Melt Visc poise 266° C. | 3340 | 4970 | 8705 | 5150 | 6370 |
| Izod, Unnotched | 15.3 | 21.7 | 33.8 | 9.5 | 17.4 |
| Izod Notched | 0.7 | 0.7 | 1.3 | 1.0 | 0.9 |
| Flexural Strn. | 16.2 | 14.3 | 12.3 | 18.6 | 13.8 |
| Flexural Mod. | 528 | 497 | 437 | 768 | 457 |
| Specific grav. | 1.75 | 1.78 | 1.77 | 1.79 | 1.76 |

Each of the examples also contained 0.1 wt. percent tetrakis(methylene(3,5-di-tert-butyl-4-hydroxyhydro-cinnamate)) methane and 0.2 wt. percent pentaerythritol tetrastearate. The glass fibers were K diameter E glass fibers.
[a]polybutylene terephthalate as in Example 1.
[b]polybutylene terephthalate as in Example 1.
[c]polycarbonate resin as in Examples 18-21.
[d]Kraton G 1651

Examples 22-26 show the effect of the addition of an ABA block copolymer and glass fibers on the Izod impact test values and on the flexural modulus. The amounts of the ABA block copolymer and the glass fibers may be varied to balance the impact resistance and stiffness values which may be required by a particular end use.

Obviously, other modifications and variations of the present invention are possible in the light of the above teachings. For example, the mineral filled compositions can be rendered flame retardant or colored using conventional materials. It is, therefore, to be understood that changes may be made in the particular embodiments described above which are within the scope of the invention as defined in the appended claims.

We claim:
1. A composition which, based on the weight of the total composition, comprises:
   (a) from 0-60 weight percent of a polybutylene terephthalate resin;
   (b) from 0-60 weight percent of a polyethylene terephthalate resin, with the proviso that the sum of the amounts of the polybutylene terephthalate resin and the polyethylene terephthalate resin must be at least 10 weight percent;
   (c) from 10-30 weight percent of an aromatic polycarbonate resin with the proviso that the amount of (a)+(b) is greater than or equal to the amount of (c);
   (d) an effective amount of a stabilizer selected from the group consisting of an acid, alkyl, aryl, or mixed phosphite having at least one hydrogen or alkyl group; acidic phosphate salts, polyacid pyrophosphates and salts thereof, phosphate salts of a Group IB or Group IIB metal and phosphorous oxo-acids;

(e) from 0–15 weight percent of a styrene-rubber impact modifier;

(f) from 29.99–79.99 weight percent of an inorganic filler selected from the group consisting of barium sulfate, strontium sulfate, zirconium oxide and zinc sulfate; and (g) from 0–30 weight percent of a fibrous glass reinforcing filler.

2. A composition which, based on the weight of the total composition, comprises:

(a) from 0–30 weight percent of a polybutalene terephthalate resin;

(b) from 0–60 weight percent of a polyethylene terephthalate resin, with the proviso that the sum of the amounts of the polybutylene terephthalate resin and the polyethylene terephthalate resin must be at least 10 weight percent with the proviso that the amount of (a)+(b) is greater than or equal to the amount of (c);

(c) from 10–30 weight percent of an aromatic polycarbonate resin;

(d) an effective amount of a stabilizer selected from the group consisting of an acid, alkyl, aryl, or mixed phosphite having at least one hydrogen or alkyl group; acidic phosphate salts, polyacid pyrophosphates and salts thereof, phosphate salts of a Group IB or Group IIB metal and phosphorous oxo-acids;

(e) from 0–15 weight percent of a styrene-rubber impact modifier;

(f) from 30–79.99 weight percent of an inorganic filler selected from the group consisting of barium sulfate, strontium sulfate, zirconium oxide and zinc sulfate; and (g) from 0–30 weight percent of a fibrous glass reinforcing filler.

3. A composition as defined in claim 1 wherein the composition comprises:

(a) from 7–15 weight percent of polybutylene terephthalate;

(b) from 3–10 weight percent of polyethylene terephthalate;

(c) from 10–25 weight percent of an aromatic polycarbonate resin;

(d) from 0.01–10 weight percent of a stabilizer selected from the group consisting of phosphites, acidic phosphate salts, polyacid pyrophosphates and salts thereof, phosphate salts of a Group IB or Group IIB metal and phosphorous oxo-acids;

(e) from 0–15 weight percent of an styrene rubber impact modifier, and (f) from 40–79.99 weight percent of an inorganic filler selected from the group consisting of barium sulfate, zirconium oxide, strontium sulfate and zinc sulfate.

4. A composition as defined in claim 2 wherein the ratio of (a):(b):(c): is about 2:1:3.

5. A composition as defined in claim 3 wherein the styrene rubber impact modifier comprises 3–10% by weight of the composition.

6. A composition as defined in claim 1 wherein the stabilizer is selected from the group consisting of acidic phosphate compounds; phosphites of the formula:

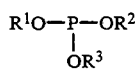

wherein $R^1$, $R^2$ and $R^3$ are independently selected from the group consisting of hydrogen, alkyl and aryl with the proviso that at least one of $R^1$, $R^2$ and $R^3$ is hydrogen or alkyl; poly acid pyrophosphates of the formula:

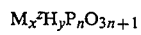

$$M_x^zH_yP_nO_{3n+1}$$

wherein M is a metal, x is a number from 1–12 and y is a number from 2–10; z is a number from 1–5 and the sum of $(xz)+y=n+2$; phosphorous oxo-acids and phosphate salts of Group IB or Group IIB metals and mixtures thereof.

7. The composition of claim 1, comprising:

(a) from 6–10 weight percent of the polybutylene terephthalate;

(b) from 5–10 weight percent of the polyethylene terephthalate;

(c) from 12–20 weight percent of the aromatic polycarbonate wherein in said molding composition, the ratio of polybutylene terephthalate to polyethylene terephthalate to aromatic polycarbonate is about 2:1:3;

(d) from 0.01–5 weight percent of the stabilizer;

(e) from 1–10 weight percent of the styrene-rubber impact modifier; and (f) from 59–72.99 weight percent of barium sulfate.

8. A composition as defined in claim 6 wherein the stabilizer is an acid phosphate compound.

9. A composition as defined in claim 6 wherein the stabilizer is selected from the group consisting of phosphites of the formula:

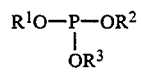

wherein $R^1$, $R^2$ and $R^3$ are independently selected from the group consisting of hydrogen, alkyl, and aryl with the proviso that at least one of $R^1$, $R^2$ and $R^3$ is hydrogen or alkyl; phosphate salts of a Group IB or Group IIB metal and polyacid pyrophosphates of the formula:

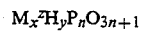

$$M_x^zH_yP_nO_{3n+1}$$

wherein M is a metal, x is a number from 1–12 and y is a number from 2–10; z is a number from 1–5 and the sum of $(xz)+y=n+2$; and phosphorous oxo-acids.

10. A composition as defined in claim 1 wherein the inorganic filler is barium sulfate.

11. A composition as defined in claim 2 wherein the inorganic filler is barium sulfate.

12. A composition as defined in claim 3 wherein the inorganic filler is barium sulfate.

13. A composition as defined in claim 4 wherein the inorganic filler is barium sulfate.

14. A composition as defined in claim 5 wherein the inorganic filler is barium sulfate.

15. A composition as defined in claim 1 wherein the stabilizer is phosphorous acid.

16. A composition as defined in claim 1 wherein the stabilizer is diphenylisodecylphosphite.

17. A composition as defined in claim 1 wherein the stabilizer is sodium acid pyrophosphate.

18. A composition as defined in claim 1 wherein the aromatic polycarbonate is a branched polycarbonate.

19. A composition as defined in claim 17 wherein the branched polycarbonate is made with a branching agent selected from the group consisting of trimellitic trichloride, tris-hydroxyphenyl ethane and isatin bisphenol.

20. A composition as defined in claim 1 which includes 5-30 weight percent of a fibrous glass reinforcing filler.

21. A composition which, based on the weight of the total composition, comprises:
   (a) from 6-10 weight percent of a polybutylene terephthalate resin;
   (b) from 5-10 weight percent of a polyethylene terephthalate resin;
   (c) from 12-20 weight percent of a branched aromatic polycarbonate resin;
   (d) from 5-10 weight percent of an ABA block copolymer impact modifier;
   (e) from 59-71.8 weight percent of barium sulfate; and
   (f) from 0.2-5 weight percent of mono sodium phosphate, phosphorous acid or diphenylisodecyl phosphate.

22. A composition as defined in claim 1 wherein the ABA block copolymer is a styrene-ethylene butylene-styrene copolymer.

23. An article which is formed from the composition of claim 1.

24. An article which is formed from the composition of claim 2.

25. An article which is formed from the composition of claim 6.

26. The composition of claim 18, comprising:
   (a) from 15-30 weight percent of the polybutylene terephthalate resin;
   (b) from 5-15 weight percent of the polyethylene terephthalate resin;
   (c) from 20-30 weight percent of the branched aromatic polycarbonate resin;
   (d) from 0.05-2 weight percent of the stabilizer;
   (e) from 0-10 weight percent of the styrene rubber modifier; and
   (f) from 30-59.95 weight percent of barium sulfate.

27. A composition as defined in claim 25 wherein the branched polycarbonate resin is made with a branching agent selected from the group consisting of trimellitic trichloride, tris-hydroxyphenyl ethane and isatin bisphenol.

28. An article which is formed from the composition of claim 25.

29. An article which is formed from the composition of claim 20.

* * * * *